United States Patent Office 3,183,813
Patented May 18, 1965

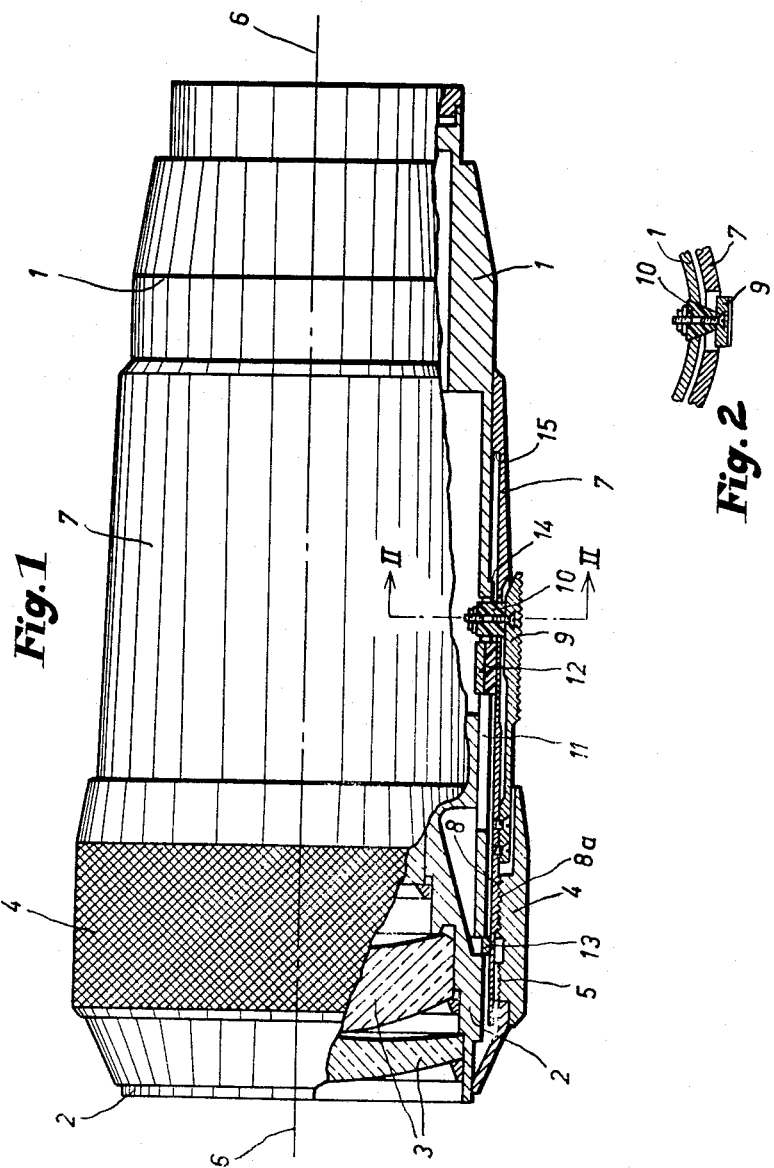

---

3,183,813
DEVICE FOR FOCUSSING OF PHOTOGRAPHIC OBJECTIVES
Karl-Heinz Wöhner, Oberkochen, Wurttemberg, and Otto Weiss, Aufhausen, Kreis Aalen, Wurttemberg, Germany, assignors to Carl Zeiss Stiftung, Heidenheim (Brenz), Germany, a corporation of Germany
Filed June 28, 1962, Ser. No. 205,927
Claims priority, application Germany, July 6, 1961, Z 8,844
8 Claims. (Cl. 95—45)

This invention relates to a device for focussing a photographic objective, particularly used on a camera provided with a mirror reflex view finder.

It is known to focus a photographic objective to a predetermined distance by rotatably adjusting a knurled ring provided on the objective mount. Such an adjusting ring is connected to the objective mount by means of an adjusting thread in such a manner that upon rotative adjustment of the ring about the axis of the objective or about the axis of the main objective mount, which latter is fixedly attached to the camera body, the photographic objective is slidably moved along the axis of the objective. In conventional cameras the focussing ring usually has to be rotatably adjusted about an angle of 180° in order to focus the objective to very near objects or to objects which are positioned in infinity. In order to accomplish such a rotative adjustment, one has to employ either both hands or, when employing one hand, the adjusting ring has to be engaged a plurality of times on different portions in order to perform a complete adjustment. In photographic cameras equipped with a mirror reflex viewfinder, particularly in single lens mirror reflex cameras which require to be held in front of the eye during the focussing, this extensive adjustment of the focussing ring about an angle of 180° has several disadvantages. First of all, the camera does not rest very securely in the hand so that the viewfinder image after the focussing operation has been completed is apt to move and secondly, the focussing requires a period of time which is relatively long and is particularly undesirable in this type of a camera which is designed for a rapid taking of pictures. When photographic objectives are used which have a relatively long focal distance, then the adjustment thread will have to have a very steep pitch to cover the entire focussing range during one full or one half (180°) rotation of the adjustment ring and such a mechanical-optical transmission ratio is rather unfavorable.

It is an object of the invention to provide a focussing device for a photographic objective, particularly for cameras provided with a mirror reflex viewfinder, in which the focussing operation can be accomplished with one hand in a quick, safe and accurate manner. The focussing device of the present invention is particularly suitable for cameras with mirror reflex viewfinders in which the objective mount is connected by a differential thread or the like with the distance adjusting or focussing member whose rotation takes place about the optical axis or about the axis of the main mount, which is fixedly attached to the camera body, so that upon a rotative adjustment of the focussing member the photographic objective is moved along its optical axis. The invention resides specifically in this that the main mount part of the objective is fixedly attached to the camera body and carries a sleeve which is axially slidable along the optical axis. This sleeve carries in turn the rotatable adjustable focussing ring in such a manner that the latter is moved with the sleeve. The focussing ring in turn is operatively connected with the photographic objective which is arranged in an axially movable mount.

Another object of the invention is to provide the mentioned axially slidable sleeve with a locking device which permits the locking of the sleeve in the desired position to the stationary main mount part.

Other objects and advantages of the invention will be apparent from the accompanying drawing in connection with the following description. The drawing illustrates by way of example a photographic objective which is provided with a focussing device of the invention.

In the drawings:

FIG. 1 illustrates in a side elevation view a photographic objective provided with the focussing device of the invention, whereby a portion is shown in axial section, and FIG. 2 is a cross sectional view along the line II—II of FIG. 1.

The photographic objective is provided with a tubular main mount part 1 which is adapted to be fixedly attached with its right hand end to a camera body (not shown). To this tubular main mount part 1 is operatively connected the objective mount 2 which carries the lens system and a diaphragm device (not shown). The objective mount 2 is surrounded by a knurled distance adjusting or focussing ring 4 by means of a conventional differential thread 5, and an axial guide is arranged in such a manner that during a rotative adjustment of the focussing ring 4 about the optical axis 6 the objective mount 2 with the lens system therein is adjusted along the optical axis. The main mount part 1 carries slidably and without play a sleeve which is adjustable along the optical axis 6 and is connected by an exterior thread 8 with a companion interior thread 8a on the focussing ring 4. FIG. 1 shows in its lower portion that the sleeve 7 carries a locking device consisting of a lengthwise extending knurled locking pawl 9 one end of which is attached to the sleeve 7 by screws or the like, while the free end of the pawl has mounted thereon a wedge-shaped block 10 whose taper converges outwardly and which is mounted in a correspondingly wedge-shaped slot or groove 11 extending through the wall of the main mount part 1. The slot or groove 11 extends in axial direction and is parallel to the optical axis 6. In the illustrated position the wedge-shaped block 10 is engaged with the inclined side walls of the groove 11 and in this position the sleeve 7 is locked to the main mount part 1. Upon pressing the latch 9 inwardly with a finger, the wedge-shaped block 10 will be moved out of engagement with the walls of the groove 11 and thereupon the sleeve 7 may be moved in axial direction relatively to the main mount part 1. In order to assure a smooth and linear slidable adjustment of the sleeve 7, the same is additionally provided with a guide block 12 which extends into the groove 11 and is slidably guided by the latter.

In the illustrated position of the lens mount 2 on the tubular main mount part 1 the lens system 3 is focussed to infinity. This means that the lens system is positioned at the closest possible distance away from the camera body or the film in the same. In this position a stop member 13 on the objective mount 2 is in abutment with the outermost end of the tubular main mount part 1. The main mount part 1 and the sleeve 7 are each provided between the ends thereof with a shoulder 14 and 15, respectively. In case the locking device should be of another construction as is illustrated, these shoulders 14 and 15 would prevent a complete slidable removal of the sleeve 7 from the tubular mount part 1 during the focussing operation. In the illustrated embodiment of the invention the two shoulders 14 and 15 determine the length of the slidable adjustment of the sleeve 7 relatively to the tubular mount part 1, and these shoulders are in engagement with one another when the lens system 3 has been adjusted sharply to an object located at the smallest distance away from the camera.

The manipulating of the photographic objective of the present invention which is constructed as a so-called "rapid shooting device" takes place in the following manner:

The camera body is held by the right hand with the right index finger resting on the shutter release member. The sleeve 7 of the camera objective is placed in such a manner into the left hand that the latter supports the weight of the objective. The index finger and the thumb of the left hand engage the knurled circumference of the focussing ring 4, while another finger of the left hand rests on the locking pawl 9. For a rapid focussing operation the locking pawl 9 is disengaged by finger pressure and the focussing ring 4 with the sleeve 7 thereon is axially moved along the tubular main mount part 1 until the object to be photographed appears moderately sharp in the viewfinder of the camera. Thereupon the locking pawl 9 is released by the finger so that the sleeve 7 will be locked in this adjusted position on the tubular main mount part 1. Now a fine focussing operation is made by rotatably adjusting the focussing ring 4 about the optical axis by means of the index finger and the thumb of the left hand until the object to be photographed appears sharply focussed in the viewfinder. The angular distance about which the focussing ring 4 during this fine focussing operation has to be rotated will be relatively short. The device of the invention therefore constitutes a rapid shooting device in which by a combined axial slidable movement and a rotative movement of a knurled focussing ring performed with one hand results firstly in a quick rough adjustment and then in a fine adjustment of the image in the finder. This focussing device may be used for snapshot pictures and also for pictures made with a tripod.

What we claim is:

1. In a device for focussing the objective of a photographic camera provided with a mirror reflex viewfinder, a tubular main mount part fixedly attachable to the body of the camera, a sleeve mounted for axially slidable movement on said tubular mount part, stop means on said tubular mount part and said sleeve for limiting the axially slidable movement of said sleeve on said tubular mount part, a rotatable manually operable focussing ring threadedly connected with said axially slidable sleeve to be axially moved with the latter, an axially adjustable objective mount containing said objective arranged in threaded engagement with said focussing ring so as to move in axial direction when said focussing ring is rotatably adjusted, a lock member for locking said sleeve and tubular part against rotational and longitudinal movement, and manually operable means for releasing said lock member to permit longitudinal sliding movement of said sleeve on said tubular part but preventing relative rotation therebetween.

2. In a device for focussing the objective of a photographic camera provided with a mirror reflex viewfinder, a tubular main mount part fixedly attachable to the body of the camera, a sleeve mounted for axially slidable movement on said tubular mount part, stop means on said tubular mount part and said sleeve for limiting the axially slidable movement of said sleeve on said tubular mount part, a rotatable manually operable focussing ring threadedly connected with said axially slidable sleeve to be axially moved with the latter, an axially adjustable objective mount containing said objective arranged in threaded engagement with said focussing ring so as to move in axial direction when said focussing ring is rotatably adjusted, locking means on said sleeve adapted to lock said sleeve on said tubular mount part against longitudinal and rotational movement and in any desired position, and manually operable means connected to said lock means to release said lock means and permit longitudinal sliding movement of said sleeve on said tubular part.

3. In a device for focussing the objective of a photographic camera provided with a mirror reflex viewfinder, a tubular main mount part fixedly attachable to the body of the camera, a sleeve mounted for axially slidable movement on said tubular mount part, stop means on said tubular mount part and said sleeve for limiting the axially slidable movement of said sleeve on said tubular mount part, a rotatable manually operable focussing ring threadedly connected with said axially slidable sleeve to be axially moved with the latter, an axially adjustable objective mount containing said objective arranged in threaded engagement with said focussing ring so as to move in axial direction when said focussing ring is rotatably adjusted, and locking means on said sleeve adapted to lock said sleeve on said tubular mount part in any desired position, said locking means comprising a manually operable latch on said sleeve, said latch normally engaging a lengthwise extending slot in said tubular mount part to lock said sleeve to said tubular mount part, said latch when manually depressed being released from engagement with said slot to permit a relative axially slidable adjustment between said sleeve and said tubular mount part.

4. A device according to claim 1, in which said lock means extends through a slot in said mount part for axially guiding said sleeve along said tubular mount part during its slidable movement.

5. A device according to claim 3, including a projection on the inner wall of said sleeve extending into said slot of said tubular mount part to prevent a relative rotative movement between said sleeve and said tubular mount part.

6. In a device for focussing the objective of a photographic camera provided with a mirror reflex viewfinder, a tubular main mount part fixedly attachable to the body of the camera, a sleeve mounted for axially slidable movement on said tubular mount part, a rotatable manually operable focussing ring threadedly connected with said axially slidable sleeve to be axially moved with the latter, an axially adjustable objective mount containing said objective arranged in threaded engagement with said focussing ring so as to move in axial direction when said focussing ring is rotatably adjusted, a latch member carried by said sleeve extending into a longitudinal slot in said mount part, said latch member and slot being provided with mutually engaging tapered friction surfaces to lock said mount part and sleeve against longitudinal and rotational movement, and manually operable means to release said latch member and permit longitudinal sliding movement of said sleeve on said mount part.

7. In a device for focussing the objective of a photographic camera provided with a mirror reflex viewfinder, a tubular main mount part fixedly attachable to the body of the camera, a sleeve mounted for axially slidable movement on said tubular mount part, a rotatable manually operable focussing ring threadedly connected with said axially slidable sleeve to be axially moved with the latter, an axially adjustable objective mount containing said objective arranged in threaded engagement with said focussing ring so as to move in axial direction when said focussing ring is rotatably adjusted, cooperating shoulders on said tubular main mount part and said sleeve respectively, said two shoulders upon adjustment of said objective to the shortest possible distance being caused to abut one another, said tubular mount part being provided with a longitudinal slot, a lock member yieldingly mounted on said sleeve extending into said slot, mutually engaging friction surfaces on said lock member and slot to hold said tubular part against rotational and longitudinal movement, and manually operable means for urging said friction surfaces out of engagement to permit longitudinal movement between said mount part and sleeve.

8. In a device for focussing the objective of a photographic camera provided with a mirror reflex viewfinder, a tubular main mount part fixedly attachable to the body of the camera, a sleeve mounted for axially slidable movement on said tubular mount part, a rotatable manually operable focussing ring threadedly connected with said axially slidable sleeve to be axially moved with the latter, an axially adjustable objective mount containing said objective arranged in threaded engagement with said focussing ring so as to move in axial direction when said focussing ring is rotatably adjusted, said objective mount extending with its rear portion slidably into the front portion of said tubular main mount, a latch member carried by said sleeve extending through a longitudinal slot in said tubular mount part, said latch member and slot being provided with mutually engaging tapered friction surfaces to lock said sleeve in a preselected position on said tubular mount part, and manually operable means connected to said latch members to release said friction surfaces and permit said sleeve to be adjusted longitudinally in a preselected position on said mount part.

References Cited by the Examiner
UNITED STATES PATENTS

| | | | |
|---|---|---|---|
| 2,238,498 | 4/41 | Mihalyi | 95—45 |
| 2,496,448 | 2/50 | Dunlavey | 88—57 |
| 3,088,370 | 5/63 | Erbe | 88—27 |

NORTON ANSHER, *Primary Examiner.*

JOHN M. HORAN, *Examiner.*